United States Patent Office 3,553,113
Patented Jan. 5, 1971

3,553,113
PROCESS FOR MAKING FOAMED RESINS
Dietrich H. Heinert, Midland, Mich., assignor to The Dow Chemical Company, Midland, Mich., a corporation of Delaware
No Drawing. Continuation-in-part of application Ser. No. 589,528, Oct. 26, 1966. This application June 18, 1969, Ser. No. 834,550
Int. Cl. C08f 47/10; C08j 1/22; C07c 143/02
U.S. Cl. 260—2.5         4 Claims

ABSTRACT OF THE DISCLOSURE

Ammonium carbamoylsulfonate decomposes to gaseous products on heating to moderate temperatures and is therefore useful as a blowing agent to foam both thermoplastic and thermoset resins. The compound can be prepared by contacting sulfur dioxide with ammonium cyanate in aqueous solution or by subjecting aqueous sodium carbamoylsulfonate to an ion exchange process.

CROSS-REFERENCE TO RELATED APPLICATION

This application is a continuation-in-part of my copending application Ser. No. 589,528, filed Oct. 26, 1966 now U.S. Pat. 3,478,090.

BACKGROUND OF THE INVENTION

The present invention relates to a new process for making plastic foams utilizing a novel, thermally decomposable blowing agent having advantageous physical and chemical properties.

Chemical compounds or mixtures thereof which decompose on heating to liberate gaseous products have long been used as blowing agents to foam natural or synthetic resins. Products such as sponge rubber, foamed polyvinyl chloride, polyurethane foams, polyethylene foams, and foamed phenol-formaldehyde resins are examples of foamed plastics which can be made in this way. Compounds such as sodium bicarbonate, azobisformamide, N,N' - dimethyl - N,N'-dinitrosoterephthalamide, and p,p' - oxybis(benzenesulfonylhydrazide) have been used for the purpose. Such blowing agents may have several disadvantages depending upon the particular application. For example, most known blowing agents decompose on heating to form both gaseous and solid products. The solid decomposition products then remain in the plastic and may impart undesirable properties such as a cloudy appearance, an off-color, or the like. In some cases, the blowing agent is comparatively expensive, particularly where a relatively small volume of gas is liberated per unit weight of compound.

SUMMARY OF THE INVENTION

It has now been found that ammonium carbamoylsulfonate is a particularly useful blowing agent for both thermoplastic and thermoset resins, either natural or synthetic. This compound, which has the chemical formula $NH_4O_3SCONH_2$, is a colorless solid which is easily prepared in pure form and which decomposes substantially entirely to gaseous products upon heating to moderate temperatures in the approximate range of 40–120° C. By incorporating ammonium carbamoylsulfonate in a thermoplastic resin such as polyethylene, in a thermoset resin such as a phenol-formaldehyde resole, in a resin curable by further reaction such as a phenol-formaldehyde novolac, or in a thermally polymerizable mixture such as a polyol-diisocyanate or polyol-polyisocyanate reaction mixture, or a polyurethane prepolymer, all in the presence of suitable polymerization catalysts, if required, the corresponding resin is produced as the foamed material upon moderate heating with no solid residue from the blowing agent remaining as a contaminant.

DETAILED DESCRIPTION

Ammonium carbamoylsulfonate can be prepared by reacting ammonium cyanate with excess ammonium bisulfite in aqueous solution according to the process described by Riedel, German Pat. 290,426 or, more conveniently, by a process described in my copending application Ser. No. 589,528, filed Oct. 26, 1966, wherein sulfur dioxide is reacted with ammonium cyanate in the presence of water.

The compound is a colorless crystalline solid which begins to decompose slowly at about 40° C., more rapidly at 70.88° C. and melts with very rapid decomposition at about 94° C. The decomposition products consist essentially of ammonia, carbon dioxide, sulfur dioxide, water vapor, and some cyanic acid. The compound is weakly acidic in aqueous solution.

These properties make ammonium carbamoylsulfonate a particularly useful blowing agent for making various kinds of foamed resins as previously described. Foams of uniform cell size and any desired density can easily be prepared by adjusting the rate and temperature of heating and the quantity of blowing agent employed. For most purposes, foams of the desired density can be prepared by using 1–10 percent of the blowing agent based on the weight of resin or polymerizable mixture.

EXAMPLE 1

A suspension of 131.8 g. of sodium cyanate in 400 ml. of water was cooled on an ice bath and 500 g. of ice was added to the mixture to adjust the temperature to 5° C. Sulfur dioxide was bubbled into the stirred mixture through a sintered glass tube while the temperature was maintained below 15° C. The suspended sodium cyanate gradually went into solution during the course of the reaction and completion of the reaction was indicated by the formation of a homogeneous solution. The weight of sulfur dioxide absorbed corresponded to the theoretical quantity of 182.2 g. Completion of the reaction is also indicated by a sharp decrease in pH of the aqueous mixture from approximately neutral to strongly acidic. Dissolved excess sulfur dioxide is easily removed from the final solution by brief exposure to reduced pressure.

Crystalline sodium carbamoylsulfonate was obtained by dilution of the reaction solution with 450 ml. of methanol and additon of 2650 ml. of tetrahydrofuran. The resulting crystal suspension was cooled at 0° C. for 12 hours and the crystalline product was filtered off and dried under reduced pressure at room temperature. There was obtained 260.2 g. of colorless crystals of sugar-like appearance. This material was identified as the monohydrate of sodium carbamoylsulfonate by elemental analysis and by infrared, mass spectral, and nucelar magnetic resonance analyses.

Ammonium carbamoylsulfonate can be prepared substantially as shown above from ammonium cyanate, but it is often more convenient to prepare this salt from an aqueous solution of the sodium salt by an ion exchange procedure as described below.

EXAMPLE 2

One liter of settled wet Dowex–50W ion exchange resin, acid form, was stirred with a liter of water and an excess of concentrated ammonium hydroxide. The neutralized resin was filtered, rinsed with water until the effluent was neutral, and then put in a three inch diameter column. Dowex–50W is a sulfonate styrene-divinylbenzene copolymer, a strong acid cation resin.

A solution of 165.1 g. of sodium carbamoylsulfonate in 320 ml. of water was then admitted to the top of the column and the solution was run through the neutralized resin at a moderate rate. The salt solution was followed with water. The forerun of water from the column was discarded and the eluate fraction of about pH 4.5 was collected. This fraction was freeze-dried at less than 0.1 mm. absolute pressure to obtain 100.2 g. of ammonium carbamoylsulfonate, a white crystalline solid which decomposes to cyanic acid, carbon dioxide, sulfur dioxide, water, and ammonia when heated above about 88° C. The crystalline product was identified as the compound named by elemental analysis and the several spectroscopic analyses previously listed.

Ammonium carbamoylsulfonate is also conveniently prepared by a simplified procedure similar to that described above wherein the intermediate isolation of the sodium salt is omitted and the reaction mixture of Example 1 is run directly through the neutralized resin.

EXAMPLE 3

To 30 g. of a phenol-formaldehyde resole resin of 11.5 percent water content, viscosity 6825 cps. at 25° C., prepared with a mole ratio of 1.5:1 formaldehyde to phenol was added 0.4 g. of Dow-Corning DC–193 silicone surfactant, a dimethylpolysiloxane-polyalkylene glycol copolymer, and the mixture was preheated for 5 minutes in a waxed paper cup at 120° C. To the preheated mixture there was added 1.8 g. of ammonium carbamoylsulfonate and 0.9 ml. of a mixture of equal volumes of concentrated hydrochloric acid and ethylene glycol. The mixture was thoroughly mixed with a high speed stirrer and put in an oven maintained at 120° C. Foaming began after one minute and after ten minutes the product was a completely cured light yellow rigid foam.

Another sample of the resin was foamed in the same way using double the quantity of ammonium carbamoylsulfonate. A lighter foam of good quanlity was obtained.

In a control experiment run as described above except for omitting the ammonium carbamoylsulfonate, some foaming also took place, but the foam volume was less and the quality of the foam was poor.

Comparative data for the two foams are listed in Table A.

TABLE A

| Ammonium salt, g. | Initial vol., ml. | Final vol. ml. | Volume expansion factor |
|---|---|---|---|
| 0 | 24.7 | 65 | 2.6 |
| 1.8 | 24.7 | 116 | 4.6 |
| 3.6 | 24.7 | 311 | 12.7 |

The foams made with the ammonium salt blowing agent were of good quality with small cells of uniform size whereas the control foam was of uneven texture with large voids.

In an analogous manner, a phenol-formaldehyde novolac resin is foamed using added formaldehyde in the conventional manner but including ammonium carbamoylsulfonate as blowing agent to obtain foams of uniform texture and otherwise good quality.

EXAMPLE 4

A mixture of 0.8 g. of the silicone surfactant used in Example 3 and 37 g. of a polyol blend containing 95% by weight of the reaction product of 14.7 moles of propylene oxide with a mole of sucrose and 5% of the reaction product of three moles of propylene oxide with a mole of 2-(2-aminoethylamino) ethanol having a hydroxyl equivalent weight of 141.5 and a 12% hydroxyl functionality was heated at 80° C. for three minutes in a large waxed paper cup. The heated mixture was then rapidly and thoroughly mixed with 23.1 g. of m-tolylene diisocyanate (a commercial 80:20 mixture of the 2,4- and 2,6-isomers) and a quantity of ammonium carbamoylsulfonate as noted below and allowed to foam autogenously. A cured rigid polyurethane foam of even texture and generally good quality was produced in 4–6 minutes in each case except for the control experiment in which no ammonium salt was used and no foaming occurred. The results of a series of such foaming experiments are listed in Table B.

TABLE B

| Run No. | Ammonium salt, g. | Foam vol., ml. | Foam density,[1] g./ml. |
|---|---|---|---|
| A | 0 | 65.5 | 0.923 |
| B | 1 | 315 | 0.194 |
| C | 2 | 467 | 0.130 |
| D | 3 | 781 | 0.0785 |
| E | 4 | 820 | 0.0737 |
| F | 6 | 1,311 | 0.0464 |

Solid chunk, no foaming.

EXAMPLE 5

Samples of granular low density polyethylene, specific gravity 0.92 were dry blended for 24 hours with 5 percent and 10 percent by weight respectively of ammonium carbamoylsulfonate. The blended powders and a control sample of polyethylene containing none of the ammonium salt were molded in a stainless steel mold at 160° C. for three minutes each. Properties of the molded samples are listed below:

TABLE C

| Run No. | NH4 salt, wt. percent | Density, g./ml. | Appearance of molded product |
|---|---|---|---|
| A | 0 | 0.89 | Clear solid. |
| B | 5 | 0.35 | Uniform foam. |
| C | 10 | 0.25 | Do. |

I claim:
1. In a process for making a foamed resin by heating a mixture of a thermoplastic or thermoset resin and a thermally decomposable blowing agent to at least the decomposition temperature of said blowing agent, the improvement wherein the blowing agent is ammonium carbamoylsulfonate.

2. The process of claim 1 wherein the resin is a phenol-formaldehyde resole or novolac.

3. The process of claim 1 wherein the resin is polyethylene.

4. The process of claim 1 wherein the resin is a polyurethane or a polyurethane prepolymer mixture.

References Cited

UNITED STATES PATENTS 3,478,090  11/1969  Heinert _____ 260—502.6

MURRAY TILLMAN, Primary Examiner

M. FOELAK, Assistant Examiner

U.S. Cl. X.R.

260—513